Patented Nov. 25, 1947

2,431,481

UNITED STATES PATENT OFFICE 2,431,481

STABLE, GELLING, ACIDIC HYDROUS SILICATES

Loren C. Hurd, Jenkintown, and William L. Van Horne, Philadelphia, Pa., assignors to Rohm & Haas Company, Philadelphia, Pa., a corporation of Delaware No Drawing. Application December 31, 1943, Serial No. 516,599

10 Claims. (Cl. 23—110)

This invention deals with acidic hydrous silicates which are capable of forming gels and films and which are capable of neutralization with stoichiometric quantities of bases. It also deals with a method for preparing such gel-forming, film-forming hydrous silicates from corresponding complex metal silicates by contacting an aqueous dispersion of said silicates with an ion-exchanger in its hydrogen form. While it has been known that metal ions may be replaced with other metal ions or hydrogen ions, no instance has heretofore been known wherein ions have been exchanged between two solids. Yet, as is shown herein, ion exchange between certain solids in aqueous slurries or suspensions may be brought about. The resulting products are new and unique. They possess unexpected utility, particularly when used to produce films. They differ from and have many unexpected advantages over acid washed clays.

Silicates rendered acid to a pH below 5 by dialysis or electrodialysis methods lose their film-forming properties or gelling properties as a result of the coagulation which inevitably results when acidities are attained which are comparable to those reached by the methods of the invention described herein.

There occur in nature hydrous silicates which are capable of forming gels and films. These generally exist as sodium, potassium, calcium, or magnesium complex hydrous silicates which are characterized by their tendency to swell and disperse in water. These silicates do not exist as pure salts, but rather as more or less altered mixtures of salts along with kaolin, calcium carbonate, magnesium carbonate, feldspar, silica, or other minerals. Perhaps the commonest source of such silicates is bentonite, which contains montmorillonite as an alkali or alkaline earth derivative, such as $CaO.Al_2O_3.4SiO_2.xH_2O.$ Other minerals such as stolpenite, erinite, steargillite, or deweylite may behave similarly.

The term "montmorillonite" has been extended to a class or group of mineral oils all of which are characterized not only by their capacity for forming gels and films but also by composition. Typical of these are montmorillonite itself, generally characterized by the composition $(Mg, Ca)O.Al_2O_3.4$ or $5SiO_2.nH_2O$ beidellite, $(Al, Fe)_2O_3.3SiO_2.nH_2O$ saponite, $2MgO.3SiO_2.nH_2O$ and metabentonite, $K_2O-MgO.Al_2O_3.SiO_2.nH_2O$. There are varieties of saponite known as hectorite and magnesium silicate wax. The former is a mixture of the silicate proper with calcium carbonate, while the latter is a saponite low in extraneous minerals.

There are also some kaolin-type minerals which may yield gels and films. Among these are halloysite, $Al_2O_3.2SiO_2.2H_2O$; allophane, $Al_2O_3.mSiO_2.nH_2O$ collyrite, $Al_2O_3.2SiO_2.nH_2O$, and schrotterite, $8Al_2O_3.3SiO_2.30H_2O$ Other minerals which may behave like bentonites, in that they swell in water, form gels, and yield films, are lucianite, sepiolite, and spadaite.

It has heretofore been known that hydrous silicates may be separated, at least in part, from coarse materials by washing, settling, or centrifuging. By these same methods, some of the accompanying materials, such as calcium carbonate or magnesium carbonate, may also be removed. The resulting dispersions, slurries, or gelatinous mixtures with water are, nevertheless, not substantially free from such materials. They vary from approximately a neutral state to definitely an alkaline state. Thus, the pH's of 5% dispersions of series of naturally occurring sodium and potassium bentonites were found to vary from 7.1 to 9.8. While the alkalinity can be reduced by rinsing with dilute acids, it has generally been considered impossible to remove all alkalinity and to remove the alkali or alkaline earth metal ions of the hydrous silicates without destroying their capacity for forming a gel structure. Whereas ordinary kaolin may be acid-washed by commercially practical means to remove impurities and rendered acidic without substantial alteration of the general and characteristic properties thereof, this cannot be done with bentonite and similar minerals because their gel-like structure does not permit separation of phases without coagulation being effected. If the gelatinous aqueous mixture is coagulated so that soluble salts may be washed out, the structure is altered and a stable hydrated gel cannot be formed therefrom.

In accordance with this invention, a method is provided whereby the film-forming hydrous silicates are rendered acidic without loss of their gel-forming properties. At the same time foreign materials, such as calcium or magnesium carbonates, are removed to an extent heretofore not realized.

These results are accomplished by contacting an aqueous dispersion of a gel-forming hydrous silicate with a cation-exchanger in its hydrogen form and separating said silicate from said exchanger.

In carrying out this invention, it is generally desirable first to purify a naturally occurring film-forming, gel-forming hydrous silicate mechanically, as by washing, settling, centrifuging, or combination of such procedures, to separate coarse materials, minerals having a density less or more than that of the hydrous silicate, or other mechanically separable impurity. The aqueous dispersion, slip, or gelatinous mixture formed or employed in these preliminary steps may be then freed of alkali or alkaline earth elements by contacting it with a cation-exchanger in its hydrogen form. Preferably, however, after the hydrous silicate is freed of mechanically removable impurities, it is worked in an aqueous suspension or gelatinous mixture with water to break up agglomerates, to effect uniform hydration of all particles, and to remove gases adsorbed in or on the particles of hydrous silicate or dissolved in the aqueous slurry or mixture. The last step may be accomplished by boiling, if desired, under reduced pressure. Details in regard to elimination of agglomerates, hydration, and removal of gases are given in co-pending application Serial No. 516,598, filed on even date.

The step of contacting the suspension or slurry with the cation-exchanger in its hydrogen form may then be performed. After thorough contacting of the suspension and exchanger, they are separated as by screening, settling, centrifuging, or other method. Depending upon the proportions of exchanger and hydrous silicate and the conditions of contact, the resultant suspension has a reduced content of alkali and alkaline earth ions and a reduced pH.

As a cation-exchanger, there may be used the hydrogen form of sulfonated carbonaceous exchangers or of sulfonated or sulfited insoluble phenol-formaldehyde resins or acid-treated humic material or other similar exchangers. Sulfonated coal, lignin, or peat, or other insoluble sulfonated humic organic material may be used. Even more suitable are the insoluble resins made from phenols, such as those made from phenol itself, diphenylol sulfone, catechol, or naturally occuring phenols as found, for example, in quebracho, and an aldehyde, particularly formaldehyde, which are modified by the introduction of sulfonic groups either in the ring or on methylene groups. Cation exchangers which are stable in their hydrogen forms are available commercially under such trade names as "Amberlite," "Ionex," "ZeoKarb," "Nalcite," "Ionac," etc. These exchangers are generally prepared in a granular form which is readily leached free of soluble acids or salts. If these exchangers are partially or wholly in a salt form, they may be converted to their acid forms by washing them with a solution of an acid, such as hydrochloric, sulfuric, formic, or the like. Excess acid may then be rinsed from the exchanger.

The aqueous dispersions or suspensions of the hydrous silicate may be of a wide range of concentration, varying from thin dispersions, suspensions, or slurries of low viscosity to gelatinous masses of considerable viscosity. It is preferred to treat dispersions of relatively low viscosity, but dispersions of high viscosity are nevertheless surprisingly capable of ion-exchange. The weight concentration in general may vary from 0.1% to 5% or more of one or more of the hydrous silicates themselves which are capable of ion exchange and capable of forming films. With some natural hydrous silicates, particularly those containing extraneous materials, concentrations up to 10% or 12% of solids may be handled effectively.

The following examples give further details of preparing acidic hydrous silicates which have gel-forming and film-forming properties and which are substantially free from extraneous salts.

EXAMPLE 1

A commercial bentonite containing montmorillonite was made into a thin gelatinous mixture or slurry with water. This mixture was left standing for seven weeks while coarse and other foreign materials settled. The pH of the original mixture was 9.1, and this was not altered by the settling procedure.

There was then added to the settled slurry and mixed therewith an insoluble phenol-formaldehyde resin having methylene sulfonic acid groups in a 30/40 mesh size. The pH of the mixture was taken from time to time as the granular resin was added. It was found to decrease progressively. From a pH of 9 to about 5, the decrease in pH was almost directly proportional to the amount of exchanger added. As the pH decreased below about 5, however, it required progressively more exchanger to depress the pH, and a pH value of about 2 was approached asymptotically. It was thus found possible to control the pH between pH 9 and about 2 by fixing the ratio of bentonite to exchanger.

The viscosity of the slurry or gelatinous mixture increased as the pH decreased. It developed with thixotropic properties below a pH of 5. In this range, it was further noted that the color of the aqueous mixture became lighter.

Analyses were made of the original bentonite (A), the bentonite after purification by settling (B), and after treatment with the hydrogen-exchanging resin to a pH of 2.2 (C). The data obtained are presented in Table I.

TABLE I

Analyses of bentonites

| Type | Percentage Composition | | | | | |
|---|---|---|---|---|---|---|
| | $SiO_2$ | $Al_2O_3$ | $Fe_2O_3$ | MgO | CaO | (NaK)O |
| A | 61.43 | 18.31 | 3.97 | 2.94 | 0.05 | 4.38 |
| B | 57.46 | 19.42 | 3.12 | 2.55 | 0.00 | 2.10 |
| C | 57.73 | 22.24 | 4.16 | 1.72 | 0.00 | 0.96 |

The aqueous dispersion of treated bentonite and resinous exchanger were separated by screening. Although a small amount of the hydrous silicate clung to the exchanger, most of this was readily removed by rinsing with water. The resinous exchanger was then treated with a 5% solution of hydrochloric acid and rinsed free of acid with water which had been almost completely desalted or deionized by treatment with a cation exchanger in its hydrogen form followed by treatment with an insoluble condensate of phenol, formaldehyde, and triethylene tetramine.

The treatment of the cation exchanger with acid returned it to its hydrogen form. This revivified exchanger was then mixed and stirred with a thin dispersion of bentonite. Again, the pH of this aqueous mixture was reduced from 9.1 to almost 2 in the same way as before. The resulting acidic hydrous silicate was substantially free from extraneous salts, including naturally occurring impurities such as calcium carbonate. Yet the acidic hydrous silicate remained gel-forming and film-forming.

EXAMPLE 2

Ten kilograms of a Wyoming bentonite was taken up in water to form a slurry, which was then passed through a supercentrifuge. The slurry then contained 4.6% solids. One kilogram of a granular, insoluble cation exchanger in its hydrogen form, which had been prepared from phenol, formaldehyde, and sodium sulfite and washed with dilute acid and desalted water, was mixed with the slurry by stirring. The pH of the slurry dropped to 5.6 from an original value of about 9. Addition of a second kilogram brought the pH of the slurry to 3.5, addition of a third kilogram to 2.9, a fourth to 2.6, a fifth to 2.3, and a sixth to 2.2. Addition of three more kilogram portions brought the pH to 2.1, making a total addition of nine kilograms of exchanger.

The resin was removed from the aqueous mixture by screening. It was found that the acid dispersion could be titrated with alkalies, including amines. The increase in pH with addition of propylene diamine is shown in Table II.

TABLE II

*Effect of alkali on 100 grams of acidic bentonite*

| Milliequivalents of Alkali | Resulting pH |
|---|---|
| 4 | 2.45 |
| 8 | 2.57 |
| 12 | 2.85 |
| 16 | 4.0 |
| 20 | 4.6 |
| 25 | 4.8 |
| 29 | 5.6 |
| 32 | 6.4 |

During the above back titration, no tendency to coagulate was encountered.

EXAMPLE 3

A bentonite slurry was prepared having a solids content of 6.65%. To one kilogram of this slurry there was added two grams of a sulfonated phenol-formaldehyde resin having an exchange capacity of one hundred milliequivalents per one hundred grams. The pH of the slurry dropped from 9.1 to 8.3. To another kilogram of the slurry was added five grams of the same resin. The pH obtained was 6.5. To a third kilogram nine grams of the resin was added. The resulting pH was 5.0.

In place of the bentonite used above, there may be used any of the complex hydrous silicates which form gels and films. In all cases, the alkali and alkaline earth metal ions which are present as cations are replaced with hydrogen ions as a result of the treatment. The alkali or alkaline earth ions present in salt forms, such as in calcium carbonate, are likewise removed.

EXAMPLE 4

Portions of commercial bentonites were made into gelatinous mixtures with water and passed through a supercentrifuge. These were then concentrated by heating to give slurries of 3% solids content. Batches of these slurries containing nine grams of solids were treated with successive five-gram portions of different commercially available cation exchangers in their hydrogen forms and the exchangers removed by filtration subsequent to each addition.

All exchangers were treated before use, according to a uniform procedure. The exchangers as received were washed with water, treated with a 3% sulfuric acid solution, and rinsed with desalted water until the effluent no longer gave a sulfate ion test with barium chloride solution. The exchangers were then drained and used with moisture contents of 36% to 40%.

The exchangers as prepared in a wet condition were added in portions of five grams each to the various batches of the aqueous mixtures of commercial bentonites, each containing nine grams of bentonite on a dry basis, and the mixture stirred. The pH of each batch was noted before and after each addition of resin. Some variations in results were observed as individual portions of the various exchangers were added, but the same end results were obtained in all cases.

(a) A portion of an aqueous slurry containing nine grams of bentonite having a pH of about 7 was treated with five grams of a commercial sulfuric acid treated coal, but the pH remained in the case of this particular slurry at 7. Upon the addition of a second five-gram portion, the pH dropped to 5; upon addition of a third portion, it dropped to 3.4; upon addition of a fourth portion, it dropped to 3.2, and, upon addition of a fifth portion, it dropped to 3.1.

(b) Another slurry having a pH of 9.6 was treated with a five-gram portion of commercial sulfonated resin made from phenols and aldehydes. The pH fell to 2.6.

(c) Another slurry having a pH of 7.5 was treated with a five-gram portion of a commercial sulfonated lignite to bring the pH to 5.9. A second five-gram portion brought the pH to 4.4, while a third lowered it still further to 3.2.

(d) A slurry having a pH of 9.1 was treated with a five-gram portion of a resin made from a phenol, formaldehyde, and sulfites with a resultant pH of 4.8. A second five-gram portion brought the pH to 3.2.

(e) A quebracho-formaldehyde resin having omega sulfonate groups was used to treat a slurry having a pH of 9.1, as in the above examples. The first five-gram portion brought the pH to 6.6, the second to 5.4, the third to 3.9, and the fourth to 3.4.

(f) A phenol-formaldehyde resin having omega sulfonate groups was used for the treatment of a slurry having a pH of 7.4 as in the above examples. The first five-gram portion brought the pH to 5.1, the second to 3.4, and the third to 2.6.

In every case, the product obtained was an acidic hydrous silicate substantially free from metallic cations, either in the silicate itself or in associated minerals which would influence the acidity or alkalinity of the system. All such acidic silicates retained gel-forming properties.

EXAMPLE 5

A hydrous silicate containing as its primary constituent the sodium, potassium, and magnesium salts of a complex magnesium silicate (i. e., a silicate having magnesium in the silicate complex) was purified by supercentrifuging an aqueous dispersion thereof and hydrating the resulting slurry by boiling and mechanically working until homogeneity was attained. The aqueous dispersion thus prepared contained 3.5% solids and had a pH of 8.5. Treatment of a portion containing ten and a half grams of solids with five grams of a sulfited phenolformaldehyde resin in its hydrogen form brought the pH thereof to 3.6. Treatment with a second such portion brought it to 2.2. The product retained its gel-forming properties, yielded excellent films, and could be stoichiometrically titrated with bases. It was noted that after a low pH was attained, there was a tendency for the pH to rise as the acidic aqueous dispersion was aged.

EXAMPLE 6

Three and six-tenth pounds of a variety of saponite known as magnesium silicate wax was dispersed in thirteen gallons of water to yield a slurry containing approximately 3.4% solids. This was centrifuged to yield a purified dispersion containing 2.75% solids. The pH of the dispersion as determined by the glass electrode was 8.8 (sample A). Nine gallons of the aqueous dispersion was agitated with five hundred grams of the hydrogen form of a sulfited phenol-formaldehyde exchange resin. The pH of the dispersion fell to 3.25 (sample B). A six-gallon portion of sample B, from which all resin had been removed by screening, was treated with a second portion of three hundred grams of the same exchange resin, and the pH fell to 3.2 (sample C). This was screened and three gallons treated with 250 grams of resin. The pH fell to 3.0 (sample D).

The above samples of resin-treated dispersions were spread and dried to yield films ranging in thickness from 1.3 to 1.5 mils. The acid films together with samples prepared from the centrifuged but untreated aqueous dispersion were subjected to identical treatment designed to evaluate the adsorptive and base exchange capacity of the dried material. Films made from sample A were found to contain 27.6% of adsorbed material, sample B 29.2%, sample C 29.4%, and sample D 31.6%. The adsorbed material was propylene diamine methacrylate.

The acidic hydrous silicates of this invention have substantial capacity for taking up alkaline materials and will take up even weakly basic reagents. Conversely, the acidic hydrous silicates are taken up and retained by materials having basic groups, such as hides and skins, and may, therefore, be used in finishing leather.

An interesting use of the acidic hydrous silicates is in molding sands, particularly in facing sands, where they have advantages over previously known bentonites in giving greater viscosity for a given solids content or the same viscosity with a smaller solids content, permitting greater porosity and increased life, and in avoiding the presence of alkali in the face of the mold, a particular advantage in the case of metals and alloys, such as magnesium or bronze, which may be pitted or attacked by slips containing alkali.

The acidic hydrous silicates of the type specified can be prepared so low in ionizable alkali or alkaline earth metals and in impurities such as calcium or magnesium carbonates that they permit the preparation of clay-type catalysts, as for petroleum refining and cracking, which have increased activity and prolonged life. The absence of such metals as cations raises the sintering temperature and improves thermal stability. These same advantages accrue even when the acidic hydrous silicates are used only as carriers. The tremendous surface presented by the silicate particles can be evenly coated with a desired chemical substance and maintained as a porous mass when dehydrated. Gelatinous masses of the acidic complex hydrous silicates taken up in water may be coagulated with such compounds as uranyl nitrate, thorium nitrate, auric nitrate, zirconyl chloride, ferric nitrate, manganous nitrate, ammonium complexes containing tungsten, etc.; and full advantage is thus gained by reason of the absence of sodium, potassium, calcium, or other similar metal ions.

The complex hydrous silicates when converted to their acid form by the method of this invention are also of value in the preparation of salves, ointments, and jellies, wherever the use of an acidic medium is helpful or desirable for controlling or killing organisms of all types. Aqueous pastes of the acidic complex hydrous silicates may be compounded with various reagents. For example, permanganates, which are unstable with organic materials and with neutral or alkaline bentonites, have been used with the acidic complex hydrous silicates of this invention to yield salve-like products which were completely stable over a six months' period. These compositions may be useful in treating poison ivy infections or in detoxifying certain war gases which are oxidizable. Aqueous gelatinous pastes have also been made with chloroamides for skin decontamination, particularly against vesicants and with such agents as the sulfonamides, including sulfanilamides, tannic acid, biotin, etc., which are of value in treating burns.

Such ointments have a distinct advantage in being based on a medium which does not support growth of fungi and bacteria.

The acidic hydrous silicates are also useful for purifying or clarifying fruit juices, wines, honey, vinegar, etc. They introduce no soluble impurities and have capacity for adsorbing and flocculating various impurities. In particular, they appear advantageous for taking up amino bodies which form complexes therewith.

The acidic hydrous silicates capable of forming gels also form films. Because of freedom from undesirable impurities and metallic ions, they present many advantages for this purpose. In particular, they can be treated with basic organic materials or heavy metal ions to develop water-resistance, good dielectric properties, and other desired properties. Films made in this way are free from extraneous salts and can be impregnated with larger amounts of treating materials.

We claim:

1. The process of preparing acidic complex hydrous silicates capable of forming gels and films which comprises contacting an aqueous slurry of salts of said silicates which swell and disperse in water with an insoluble cation exchanger in its hydrogen form and separating the exchanger from the silicate.

2. The process of preparing acidic complex hydrous silicates capable of forming gels and films which comprises contacting an aqueous slurry of naturally occurring silicates which are capable of forming gels and films and of swelling and dispersing in water with an insoluble cation exchanger in its hydrogen form and separating the exchanger from the slurry.

3. The process of preparing complex hydrous silicates in an acid form which is still capable of forming gels and films which comprises contacting an aqueous dispersion of a montmorillonite with an insoluble cation exchanger in its hydrogen form and subsequently separating the exchanger from the dispersion.

4. The process of preparing complex hydrous silicates in an acid form which is still capable of forming gels and films which comprises contacting an aqueous dispersion of saponite with an insoluble cation exchanger in its hydrogen form and subsequently separating the exchanger from the dispersion.

5. The process of preparing complex hydrous silicates in an acid form which is still capable of forming gels and films which comprises contacting an aqueous dispersion of a montmorillonite with an insoluble sulfonated cation exchanger in its hydrogen form and subsequently separating the exchanger from the dispersion.

6. The process of preparing complex hydrous silicates in an acid form which is still capable of forming gels and films which comprises contacting an aqueous dispersion of saponite with an insoluble sulfonated cation exchanger in its hydrogen form and subsequently separating the exchanger from the dispersion.

7. The process of preparing complex hydrous silicates in an acid form which is still capable of forming gels and films which comprises contacting an aqueous dispersion of a montmorillonite with an insoluble sulfonated phenol-formaldehyde resin in its hydrogen form and subsequently separating the resin from the dispersion.

8. The process of preparing complex hydrous silicates in an acid form which is still capable of forming gels and films which comprises contacting an aqueous dispersion of saponite with an insoluble sulfonated phenol-formaldehyde resin in its hydrogen form and subsequently separating the resin from the dispersion.

9. The process of preparing complex hydrous silicates in an acid form substantially free from extraneous salts and capable of forming films and aqueous gels which comprises contacting an aqueous dispersion of a salt of a complex aluminum silicate capable of film and gel formation and of swelling and dispersing in water with an insoluble cation exchanger in its hydrogen form and separating said exchanger from the silicate treated therewith.

10. The process of preparing complex hydrous silicates in an acid form substantially free from extraneous salts and capable of forming films and aqueous gels which comprises contacting an aqueous dispersion of a salt of a complex magnesium silicate capable of film and gel formation and of swelling and dispersing in water with an insoluble cation exchanger in its hydrogen form and separating said exchanger from the silicate treated therewith.

LOREN C. HURD.
WILLIAM L. VAN HORNE.

REFERENCES CITED

The following references are of record in the file of this patent:

UNITED STATES PATENTS

| Number | Name | Date |
| --- | --- | --- |
| 1,013,603 | Keppeler et al. | Jan. 2, 1912 |
| 1,907,690 | Wait | May 9, 1933 |
| 2,069,564 | Tiger | Feb. 2, 1937 |

OTHER REFERENCES

Davis et al., "Bentonite: its properties, mining, preparation, and utilization," U. S. Bureau of Mines, Technical Paper No. 609, page 18. Government Printing Office, Washington, D. C., (1940).

Certificate of Correction

Patent No. 2,431,481.                                November 25, 1947.

LOREN C. HURD ET AL.

It is hereby certified that error appears in the printed specification of the above numbered patent requiring correction as follows: Column 1, line 46, for the words "mineral oils" read *minerals*; and that the said Letters Patent should be read with this correction therein that the same may conform to the record of the case in the Patent Office.

Signed and sealed this 30th day of March, A. D. 1948.

[SEAL]

THOMAS F. MURPHY,
*Assistant Commissioner of Patents.*